United States Patent
Trojer

(10) Patent No.: US 8,472,804 B2
(45) Date of Patent: Jun. 25, 2013

(54) SYSTEM AND METHOD FOR LONG BACKHAUL LINK EXTENSION IN A PASSIVE OPTICAL NETWORK

(75) Inventor: Elmar Trojer, Taby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 624 days.

(21) Appl. No.: 12/531,665

(22) PCT Filed: Mar. 12, 2008

(86) PCT No.: PCT/IB2008/000578
§ 371 (c)(1),
(2), (4) Date: Mar. 22, 2010

(87) PCT Pub. No.: WO2008/114110
PCT Pub. Date: Sep. 25, 2008

(65) Prior Publication Data
US 2010/0189433 A1    Jul. 29, 2010

Related U.S. Application Data

(60) Provisional application No. 60/895,156, filed on Mar. 16, 2007.

(51) Int. Cl.
*H04J 14/00* (2006.01)
(52) U.S. Cl.
USPC .............................. 398/72; 398/70
(58) Field of Classification Search
USPC .................................... 398/70–72
See application file for complete search history.

(56) References Cited

U.S. PATENT DOCUMENTS

| 6,996,123 B1* | 2/2006 | Jiang et al. ............. 370/465 |
| 2004/0052528 A1* | 3/2004 | Halgren et al. ............ 398/75 |
| 2010/0021161 A1* | 1/2010 | Endo et al. ............. 398/45 |

FOREIGN PATENT DOCUMENTS

| WO | WO 2006/094960 A | 9/2006 |
| WO | WO 2008/064984 A | 6/2008 |

OTHER PUBLICATIONS

Qiu XZ et al: "High Performance Burst-Mode Upstream Transmission for Next Generation PONs" Optical Fiber Communication & Optoelectronic Exposition & Conference, 2006. AOE 2006. Asian, IEEE, PI, Oct. 1, 2006, pp. 1-3, XP031047147—ISBN: 978-0-9789217-0-5.

* cited by examiner

*Primary Examiner* — Nathan Curs
(74) *Attorney, Agent, or Firm* — Roger S. Burleigh

(57) ABSTRACT

A system and method of extending a trunk reach of a passive optical network, PON. An optical network termination, ONT, processes upstream and downstream PON signals on a trunk fiber with an optical line termination, OLT, at a central office. An extender device may be implemented at a user's home, a remote node, or at the central office. The extender device includes a time division multiplexing, TDM, unit for multiplexing the PON signals, a forward error correction, FEC1 unit for applying an FEC to the PON signals, and a regenerator for applying optical-electrical-optical, OEO, regeneration to the PON signals.

24 Claims, 10 Drawing Sheets

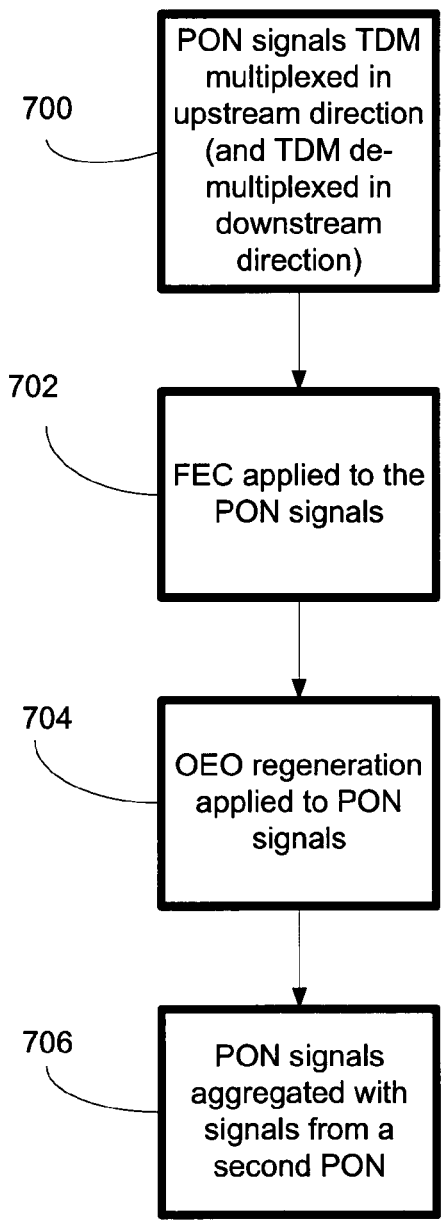

SYSTEM AND METHOD FOR LONG BACKHAUL LINK EXTENSION IN A PASSIVE OPTICAL NETWORK

TECHNICAL FIELD

The present invention relates generally to communications networks, and in particular, to communications networks that employ systems and methods to extend a link for a passive optical network (PON).

BACKGROUND

There is growing demand for higher rates of transmission in an access network. Because of this growing demand coupled with higher competition among network operators in the broadband market and price erosion on optical components, an increased interest is seen in fiber-based access technologies. Currently, there are several operators considering the deployment of various types of fiber access network systems.

FIGS. 1A-1C illustrate existing fiber optics networks. The various configurations depicted in FIG. 1 include a central office 10 with an optical line termination (OLT) 12 having a link to an optical network unit (ONU) 14 and/or optical network termination (ONT) 24 leading to a home network 16. FIG. 1A illustrates a first step in replacing copper lines with fiber lines by placing the ONU 14 in the vicinity of a user located in the home network 16. A point-to-multipoint fiber network 18, referred to as an optical distribution network (ODN) connects the OLT to the ONU/ONT to provide a fiber-to-the-cabinet (FTTcab) link in relatively close proximity to the home network. A copper link 20 between the ONU and a network termination (NT) 22 is thereby shortened, allowing higher-rate DSL transmission modes, such as VDSL2, instead of rate-limited ADSL2+, technology that is today widely deployed to span long distances between the central office and the user premises.

FIG. 1B illustrates a configuration in which the fiber link is terminated closer to the home network (for example, building/business or curb) utilizing a very short copper-length (house wiring) bridged by DSL or Ethernet (for example, fiber-to-the-building/business (FTTB) and fiber-to-the-curb (FTTC)). The rationale behind this kind of architecture is that fiber deployment becomes more expensive the closer it extends toward the user. Thus, fiber is provided to a specific point prior to the customer premise.

FIG. 1C illustrates a configuration in which the copper link is totally replaced by the fiber link from the central office to the user (i.e., fiber-to-the-home (FTTH)). FIG. 1C illustrates a migration to all-optical access with the fiber link 18 extending from the OLT 12 to an optical network termination (ONT) 24 at the customer premises.

Optical networks can be split into two families of networks: active and passive optical networks. If the optical distribution network (ODN) 18 contains active equipment, it is considered an active network. If the ODN is totally passive, the system is called a passive optical network (PON) and mainly exists in a point-to-multipoint (p2 mp) architecture. Point-to-point (p2p) structures are typically available (fiber-based Ethernet) for active optical networks.

PONs have gained great attention in the last few years due to the low cost of utilizing the p2 mp scheme (component sharing), which utilizes a fiber-frugal tree-topology, low maintenance (no remote powering in the FTTH configuration), and failsafe performance advantages (e.g., high mean-time between failure, no active parts).

FIG. 2 illustrates a typical architecture of an existing PON 50. The PON includes a user network interface (UNI) 52 at a T reference point, an adaptation function (AF) 54, an ONU 56 or ONT 58, wavelength division multiplex (WDM) modules 60 and 62, network elements 64 and 66, an optical splitter 68, a service node interface (SNI) 70 at a V reference point, and a service node function 72. The letter S denotes an optical connection point/splice on the optical fiber just after the OLT 74 for downstream traffic and just after the ONU 56 for upstream traffic. The letter R denotes an optical connection point/splice on the optical fiber link just before the ONU for downstream traffic and just before the OLT for upstream traffic. An ODN 80 is also shown between connection points R and S.

The OLT 74 sends data downstream to all ONUs 56 and/or ONTs 58 via the ODN 80 using time division multiplexing (TDM). In the upstream direction, different ONUs 56 and/or ONTs 58 may be granted timeslots to communicate data to the OLT via a time division multiple access (TDMA) scheme controlled by the OLT. Upstream and downstream data transfer is separated on different wavelengths. In addition, video-overlay on a separate wavelength (e.g., wavelength division multiplying WDM) is typically supported by most PONS. The ODN consists of a common trunk fiber, a passive power splitter forking up to different users, and user-individual drop-fibers. The splitter is commonly placed in the field at a remote node (RN, not shown in FIG. 2).

There are currently three implementations of PON schemes. The implementations are Ethernet PON (EPON), Broadband PON (BPON), and Gigabit PON (GPON). Table 1 below illustrates the major PON technologies and properties of the technologies.

TABLE 1

| Characteristics | EPON | BPON | GPON |
|---|---|---|---|
| Standard | IEEE 802.3ah | ITU-T G.983 | ITU-T G.984 |
| Protocol | Ethernet | ATM | ATM/Ethernet |
| Rates (Mbps) | 1244 up/1244 down | 622/1244 down 155/622 up | 1244/2488 down 155 to 2488 up |
| Span (km) | 10 | 20 | 20 |
| No. of splits | 16 | 32 | 64 |

As seen in Table 1, GPON, as a successor to BPON, is the most advanced system in terms of protocol rates, total span (trunk plus drop span), and the number of users per OLT (split-ratio).

FIG. 3 illustrates an existing GPON system 100 configuration. The GPON system includes an ONU 102 with a UNI 104, an ONU 106 with a UNI 107, a splitter 108, and an OLT 110 with a SNI 112. For the ranging procedure to work, the maximum logical differential distance between farthest and nearest ONU must be less than 20 kilometers. The total maximum reach is specified to 60 km and is limited by timing constrains on the service layer. For standard Class B+ optics, a physical reach of 20 km on a 32 split are practical. On full split and maximum rate, the total physical reach is specified as 10 kilometers by keeping the same trunk-drop ratio limitation.

There are available systems providing various GPON OLT system functions. Such systems may include switch fabric and GPON optics as discussed above. In the upstream direction, a burst clock and data recovery (CDR) unit may handle the TDMA data from the different ONUs and ONTs. In both directions, serializer-deserializer (SERDES) units provide serial/parallel conversion between physical media dependent and the GPON Transmission Convergence (GTC) stack specified.

Although there are PON systems having a rate-reach product in the range of 10 Gbps·km (EPON, BPON) to 50 Gbps·km (GPON) and maximum split-ratios of 16 to 64, there is an increasing demand for higher numbers, both in rate (towards 10 Gbps, 40 Gbps to enable 1 Gbps per user) and reach (60 km physical for short backhaul, and larger 100 km for long backhaul). As currently under discussion in IEEE 802.3av (10 Gbit/s Ethernet Passive Optical Network task force) and ITU-T Full service Access Node (FSAN) next generation access (NGA), the next generation of PONs must extend rates at least 10 Gbps downstream and 2.5 Gbps upstream.

There are currently no solutions providing all of the performance enhancements desired. Regarding the desired increase in rate, there are several problems to overcome when increasing a GPON to a 10GPON system. In particular, 10GPON systems must co-exist with the regular GPON on the same fiber (fiber-lean scenario). Moreover, more powerful optical components are necessary.

Regarding the desired increase in reach, current PON systems (as well as p2p Ethernet-based systems) are limited in the total span and, thus, are not appropriate for medium or long backhaul scenarios which virtually shift the central office up to the transport domain to extend the passive ODN with all its advantages. In that sense, central offices can be consolidated, reducing operational expenses.

Systems with trunk-spans greater than 100 km will be necessary in the future without any major modifications on the GPON system.

SUMMARY

The present invention extends the trunk reach of a passive optical network (PON). Operators desire a 100 kilometer reach for extended PON systems in order to accomplish cost reductions by implementing "cold central offices," as well as avoiding the need for costly central offices by backhauling access user traffic directly towards metro nodes. In order to provide efficient (cold) central offices in terms of operational expenditures, the present invention provides a reduction of the amount, size, and/or power consumption of the active equipment. In one embodiment, this may be accomplished by an extended reach PON system where OLTs are collected higher up in the network hierarchy with small, power-frugal extender devices remaining in the central offices.

Thus, in one embodiment, the present invention is directed to a method of extending a trunk reach of a PON. The method begins by conducting time division multiplexing (TDM) on upstream and downstream PON signals on a trunk fiber in the PON. A forward error correction (FEC) is applied to the PON signals. In addition optical-electrical-optical (OEO) regeneration is applied to the PON signals. The step of applying OEO regeneration includes applying burst re-shaping, re-amplifying, re-timing (3R) regeneration to the PON signals.

In another embodiment, the present invention is directed to a system for extending the trunk reach of the PON. The system includes an optical network termination (ONT) for processing upstream and downstream PON signals on a trunk fiber, an optical line termination (OLT) residing within a central office communicating with the ONT, and an extender device coupled to the OLT. The extender device includes a TDM unit for applying TDM to the PON signals, a FEC unit for applying an FEC to the PON signals, and a regenerator for applying OEO regeneration to the PON signals.

In another embodiment, the present invention is an extender device for extending a trunk reach of a PON. The extender device includes a TDM unit for applying TDM to the PON signals, a FEC unit for applying an FEC to the PON signals, and a regenerator for applying OEO burst 3R regeneration to the PON signals. The regenerator may include a small form factor pluggable module (XFP) for applying OEO regeneration. The extender device efficiently and easily modifies a PON system to increase the reach, for example, by a factor of ten, thereby allowing a shift of the OLT higher up in the network hierarchy.

BRIEF DESCRIPTION OF THE DRAWINGS

FIG. 10 is a flow chart illustrating the steps of an embodiment of the method of the present invention.

DETAILED DESCRIPTION

The present invention is a system and method for extending the reach of a GPON system. There are several alternative embodiments for expanding the PON reach. First, the split or rate may be reduced in a Class B+ GPON. By reducing the rate by a factor of four, together with a split-reduction of a factor of four, a class D+ (45 dB) link budget is available that may be used to increase the total reach to 60 kilometers. Second, transmitter (Tx) optical power (direct modulation vs. external modulation) and receiver (Rx) sensitivity (PIN PD vs. APD) may be increased. Third, Forward Error Correction (FEC) may be utilized to maintain the bit error ratio of the link when increasing the link loss (reach). Fourth, optical amplification (semiconductor optical amplifiers, erbium doped fiber amplifiers, Raman amplifiers and other fiber amplifiers) may be utilized. Finally, the present invention may utilize Optical-Electrical-Optical converters with burst re-shaping, re-amplification, re-timing (3R) regenerators, and WDM on the trunk line. By improving the optics at the ONU and by using FEC, small reach increases are created. Optical amplifiers, either by boosters at the OLT or line-amps at the remote node, may extend the reach to approximately 60 kilometers, for example, by requiring active equipment in the remote node. However, OEO converters, burst 3R regenerators, and WDM on the trunk line may increase the reach to 100 or more kilometers.

Figure 1:
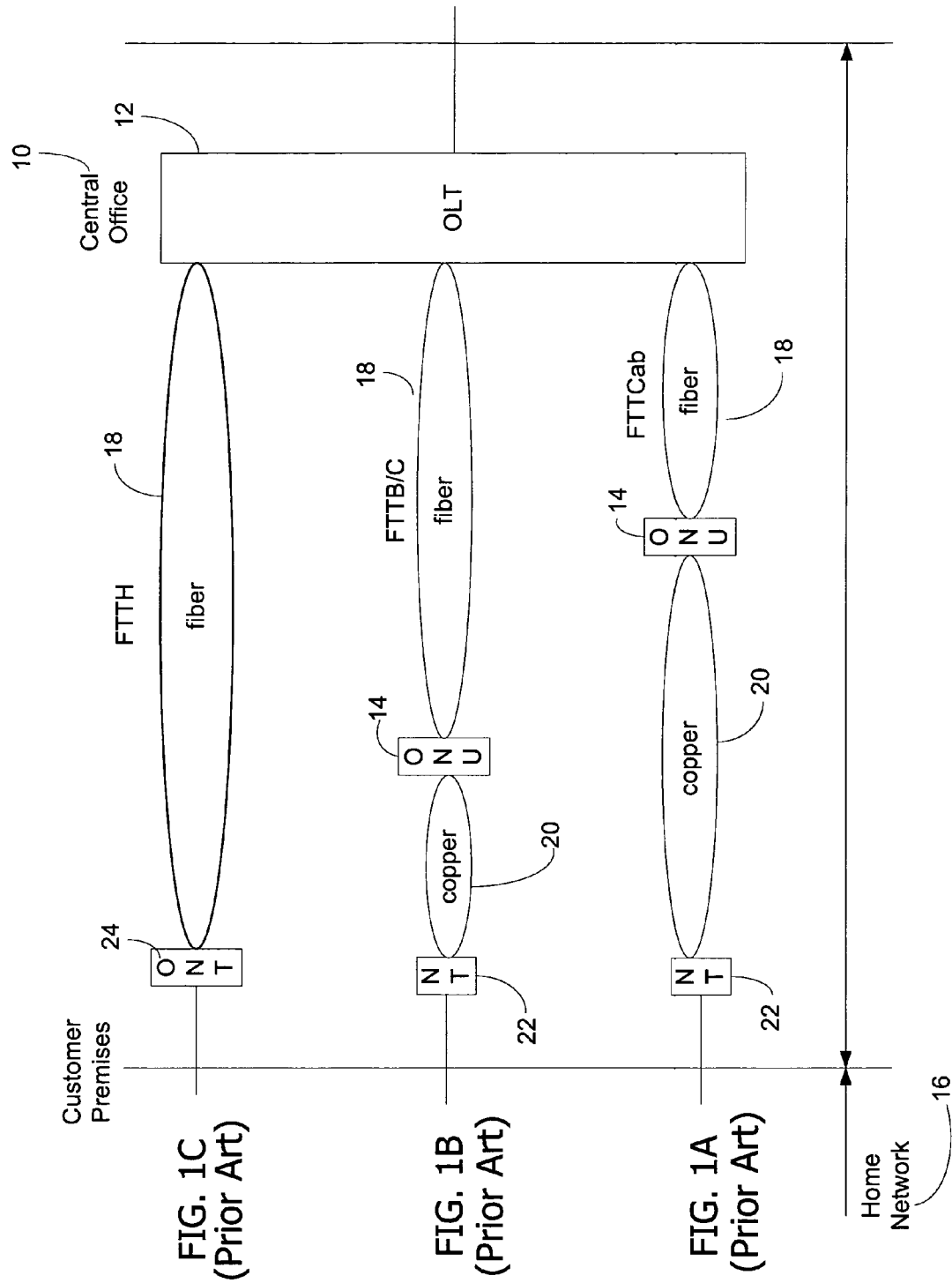
FIGS. 1A-1C (prior art) illustrate existing fiber optics networks.
Figure 2:
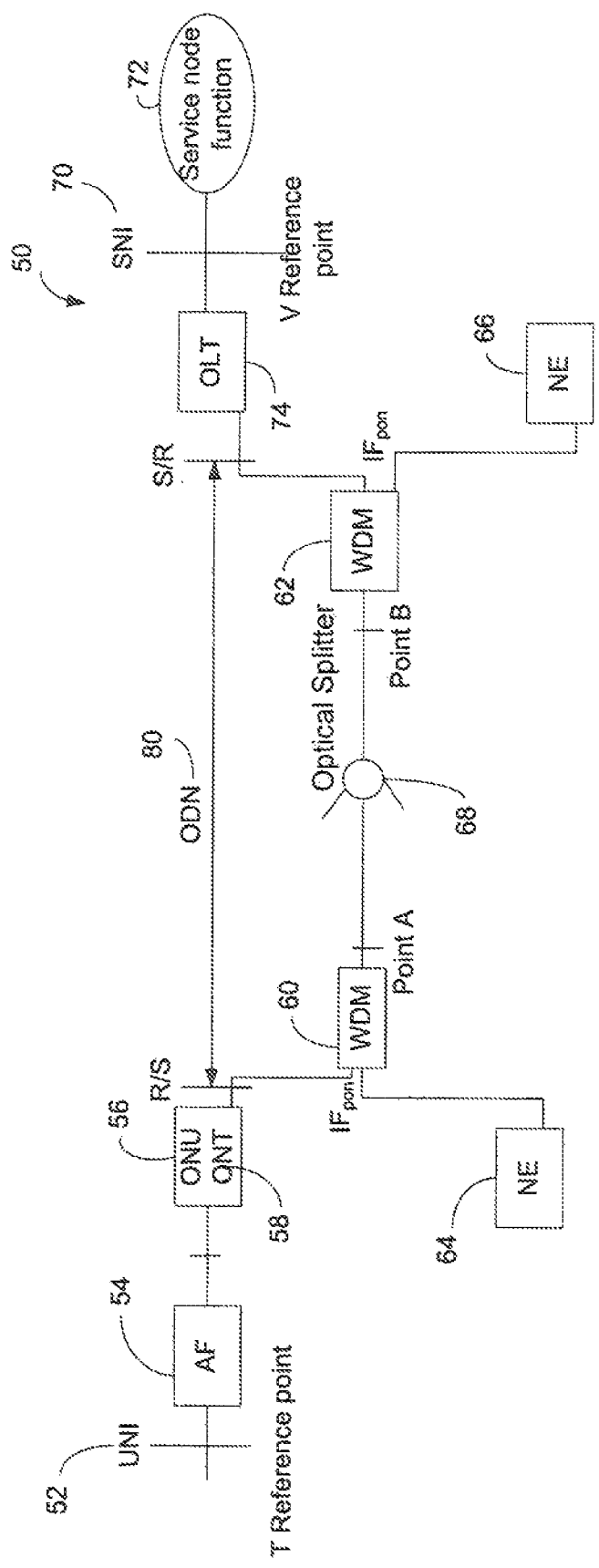
FIG. 2 (prior art) illustrates a typical architecture of an existing PON.
Figure 3:
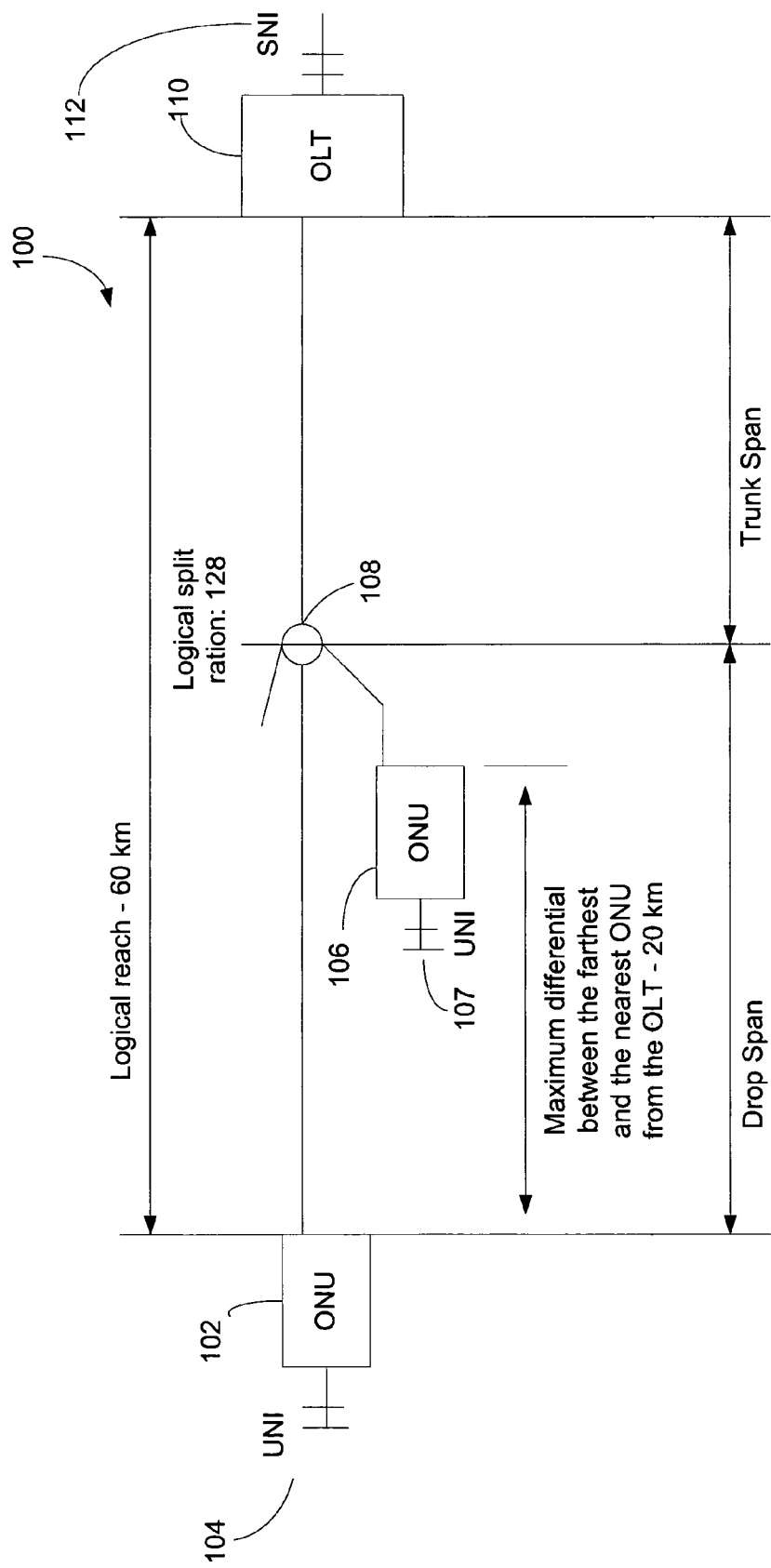
FIG. 3 (prior art) illustrates an existing GPON system configuration.
Figure 4:
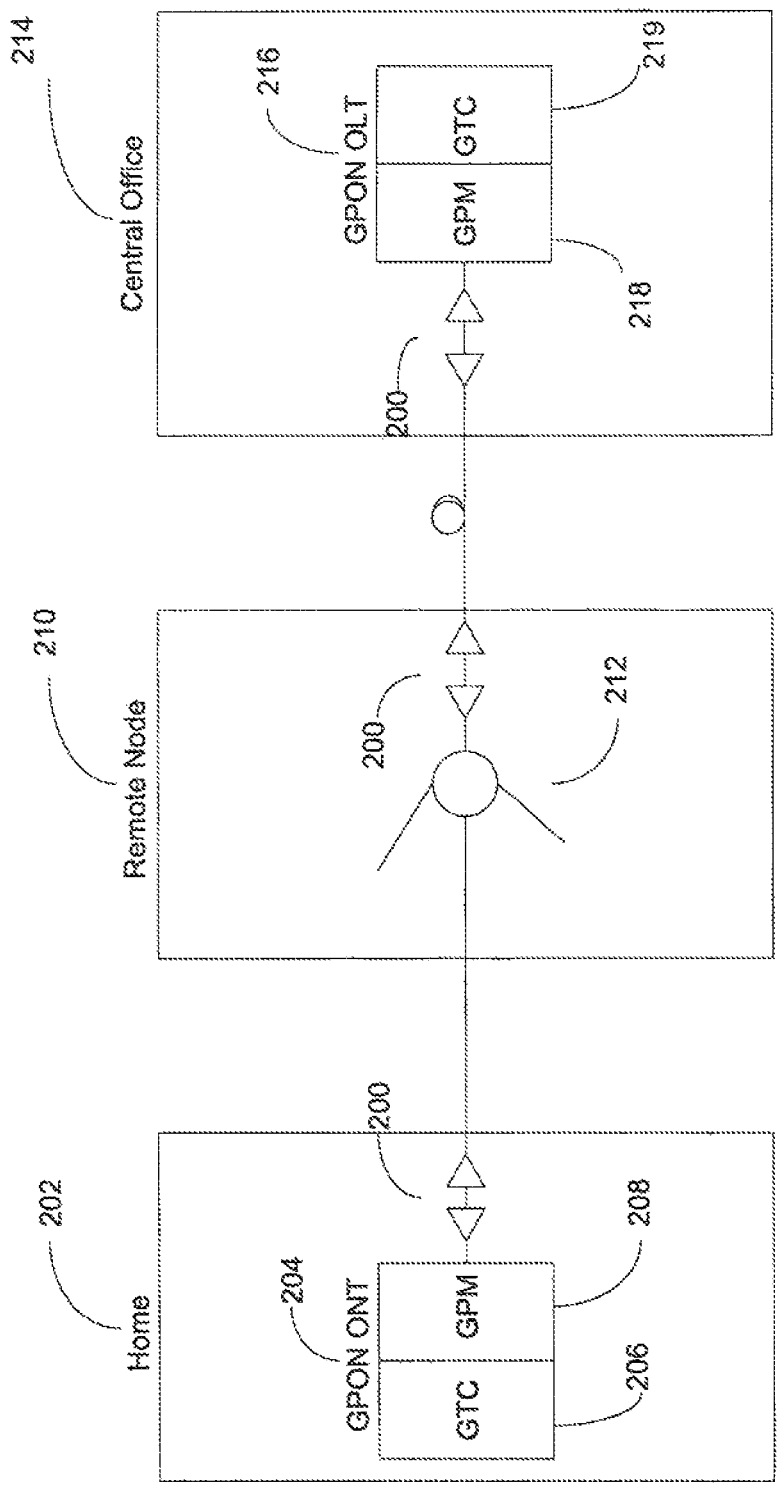
FIG. 4 illustrates three amplification-placing alternatives for use in the present invention.

FIG. 4 illustrates three amplification-placing alternatives for use in the present invention. In the first option, an extender device 200 is positioned within a home 202 with a GPON ONT 204. The GPON ONT 204 includes a GTC function 206 and a GPON physical media layer GPM function 208. In the second option, the extender device 200 is placed in a remote node 210 with a splitter 212. In the third option, the extender device 200 is located in a central office 214 with a GPON OLT 216 with a GPM function 218 and a GTC function 219. In the preferred embodiment of the present invention, the extender device preferably resides in the central office 214.

In the present invention, the amplification may be conducted by purely optical or OEO regeneration (i.e., Burst 3R regeneration). The present invention provides a method and system for extending the reach of a regular PON system based on a split of the OLT into optics and the remaining portion to the GPM function. With this split and the extender device 200 residing in the central office, the present invention can perform OEO and burst regeneration to provide considerable reach extension while positioning the OLT higher up in the network. The regeneration, together with transport mapping (OLT signal packing) and FEC wrapping, are utilized in the present invention.

Figure 5:
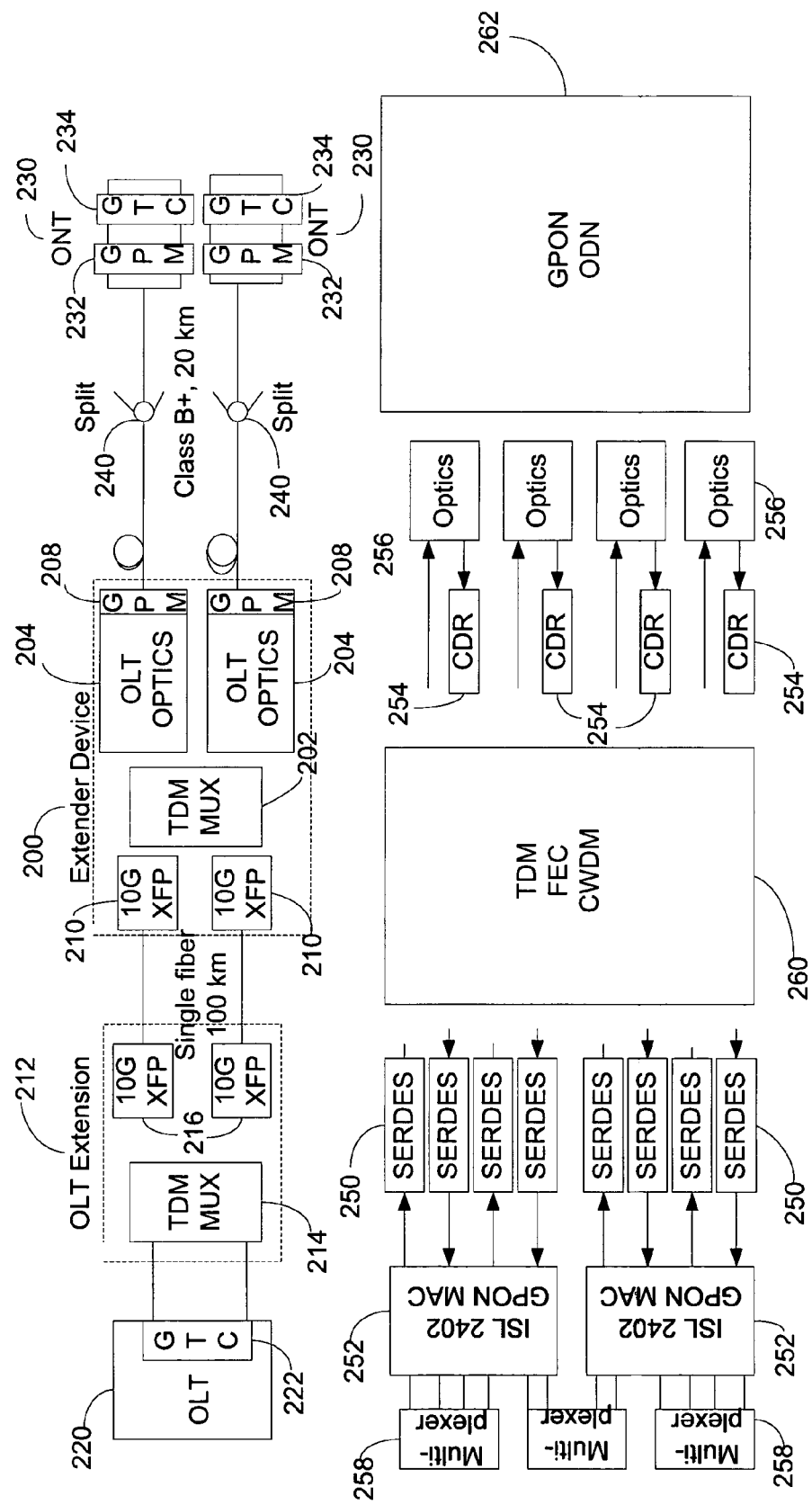
FIG. 5 is a simplified block diagram illustrating the extender device in the preferred embodiment of the present invention.

FIG. 5 is a simplified block diagram illustrating the extender device 200 in an embodiment of the present invention. The extender device includes a TDM multiplexer (MUX) 202 and OLT optics units 204. Each OLT optics unit includes GPM functionality 208. The extender device also Includes a 10G small form factor pluggable module (XFP) 210. An OLT extension 212 includes a TDM MUX 214 having a 10G XFP 216 connected to the 10G XFP 210 in the extender device. The OLT extension 212 is coupled to an OLT 220 having a GTC function 222. The extender device is coupled to ONTs 230, each having a GPM function 232 and a GTC function 234. In addition, splitters 240 are located between the ONTs and the extension device.

FIG. 5 also illustrates exemplary protocols that may be utilized in each portion of the data path. For example, the OLT 220 may utilize SERDES 250, GPON MACs implementing GTC 252, and quad PI-IY multiplexers 258. The OLT extension 212 and extender device 200 may utilize TDM, FEC, and CWDM 260. The OLT optics units 204 may utilize burst CDRs 254 and GPON optics 256. Finally, the optical distribution network (ODN) to the ONTs 230 may utilize the ITU-T G.984 GPON protocol.

The GPON PMD at the OLT 220 is divided into two parts where the optics and burst CDR are moved into the extender device 200 and reside in the central office. The SERDES 250 and GTC function 222 remain in the OLT. In this way, the PON signals (stream of one and zeros, not the GPON protocol) are terminated in the extender device while the GPON ODN functionality and ONTs/ONUs 262 remains unchanged. In this configuration, the extender device provides both OEO with regeneration and continuous-wave signals towards the OLT.

The extender device 200 utilizes standard time division multiple (TDM) with forward error correction (FEC) to combine signals of several PONs upstream and downstream on a single fiber (i.e., Quad-GPON can be transported via a single 10G XFP module). The system is easily extendable by using coarse or dense WDM on the same fiber.

The extender device 200 multiplexes upstream PON signals on the trunk fiber and de-multiplexes the downstream signals towards the individual PON optics. In the preferred embodiment of the present invention, standard TDM is performed. For bridging a 100 kilometer distance, in-band forward correction (FEC) is also applied. The extender device acts as a burst OEO 3R regenerator.

The optical transport network (OTN) used in the synchronous digital hierarchy (SDH), or equally SONET, provides the functionality necessary for the extender device (e.g., TDM, forward error correction FEC, 3R generation). Preferably, an optical channel transfer unit 2 (OTU-2) is used to transport GPON signals over the back-haul. The OTU-2 has a nominal bit rate of 10.7 Gbps which corresponds to an optical channel 192 (OC 192) in SONET terms.

Figure 6:
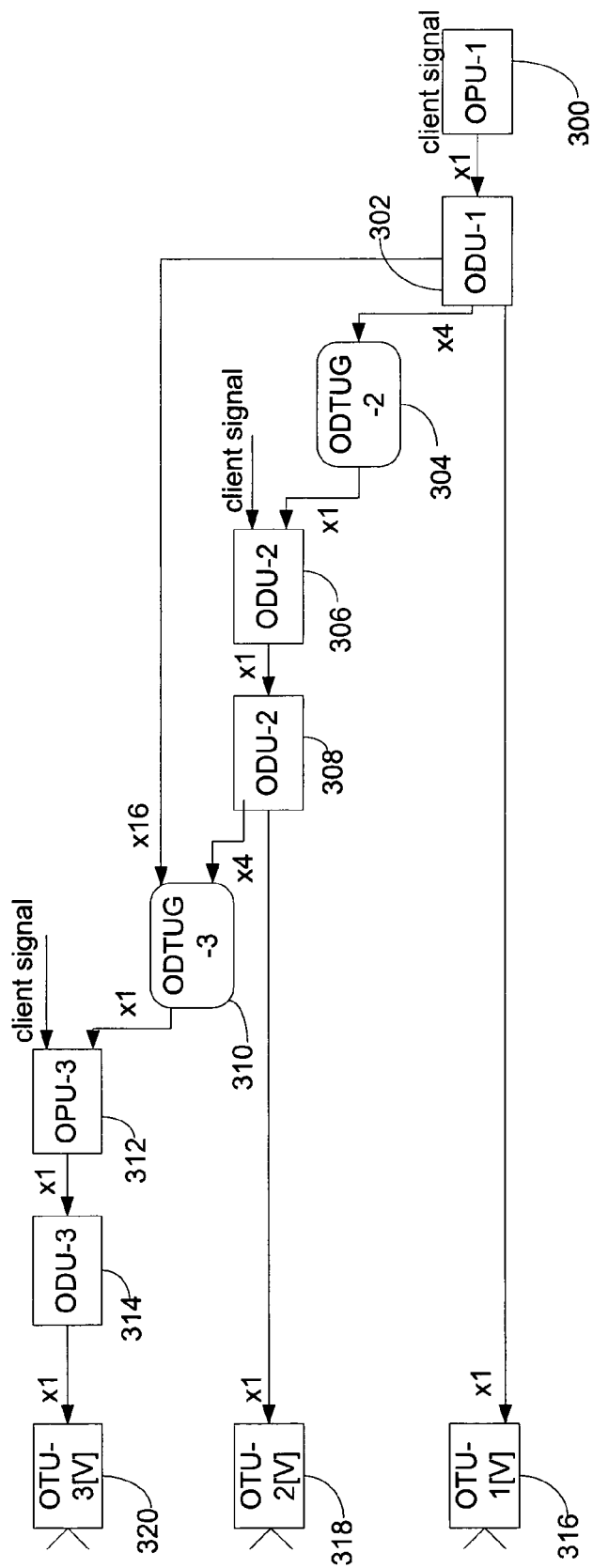
FIG. 6 illustrates a partial TDM OTU-2 Multiplexing chain in the preferred embodiment of the present invention.

FIG. 6 illustrates a partial TDM OTU-2 Multiplexing chain in the preferred embodiment of the present invention. OLT signals (client signal) are packed into optical channel data units (ODU-1) 300. FIG. 6 illustrates an optical channel payload unit (OPU) OPU-1 300 having a client signal, an optical channel data tributary unit group (ODTUG-2) 304, a OPU-2 306, an ODU-2 308, an ODTUG-3 310, an OPU-3 312, an ODU-3 314, an OUT-1[V] 316, an OUT-2[V] 318, and an OUT-3[V] 320. Four ODU-1s 302 are TDM multiplexed into the ODTUG-2 304 serving as input to the ODU-2 306 that together with an overhead forms an ODU-2 308 signal. The ODU-2 signal, together with the FEC fraction, represents an OTU-2 signal ready to be transported.

Figure 7:
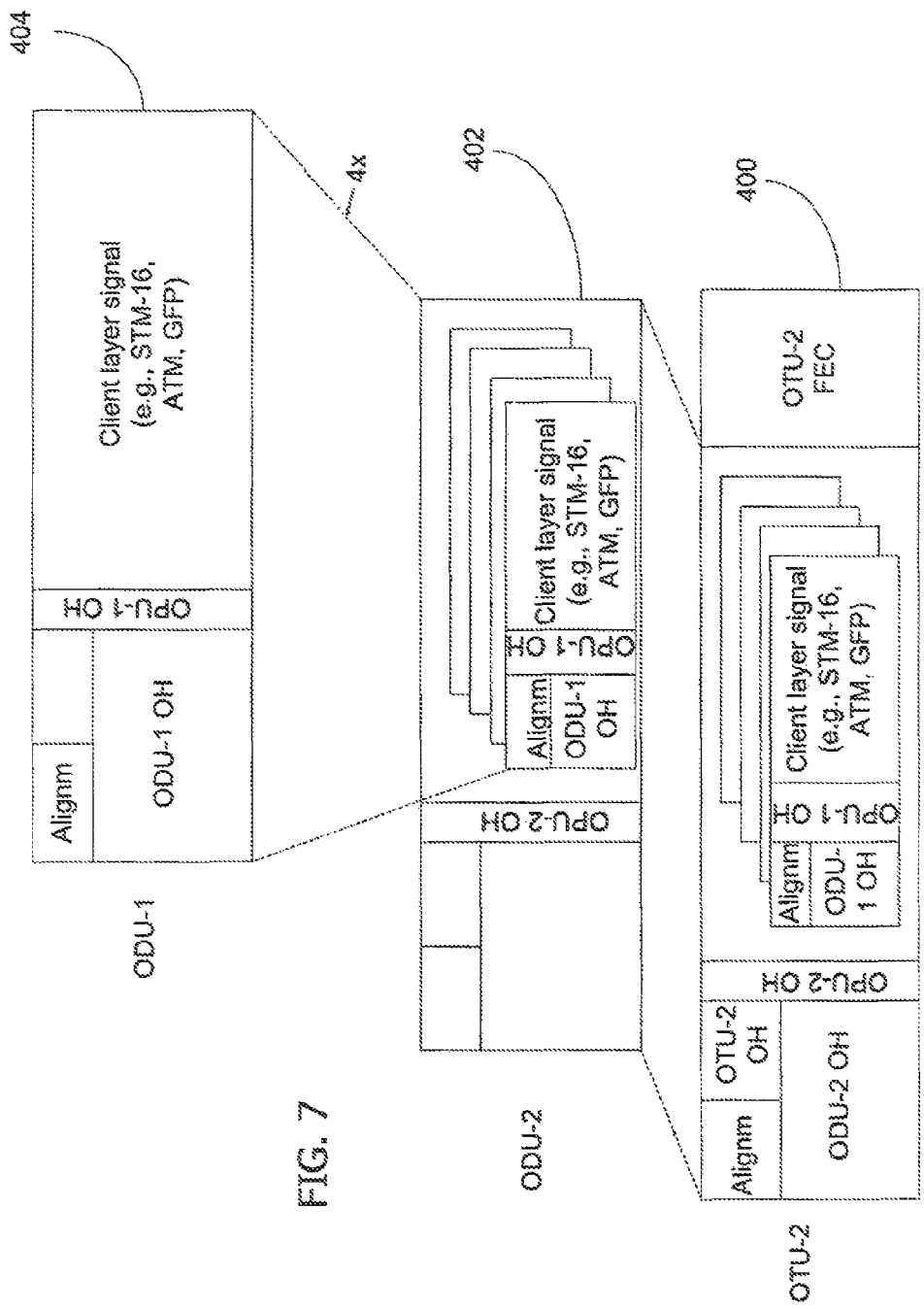
FIG. 7 is a simplified block diagram illustrating multiplexing by the ODU-1 into an OTU-2 signal.

FIG. 7 is a simplified block diagram illustrating more detail of an exemplary multiplexing of four ODU-1 signals 404 into an ODU-2 402 and an OTU-2 signal 400.

Figure 8:
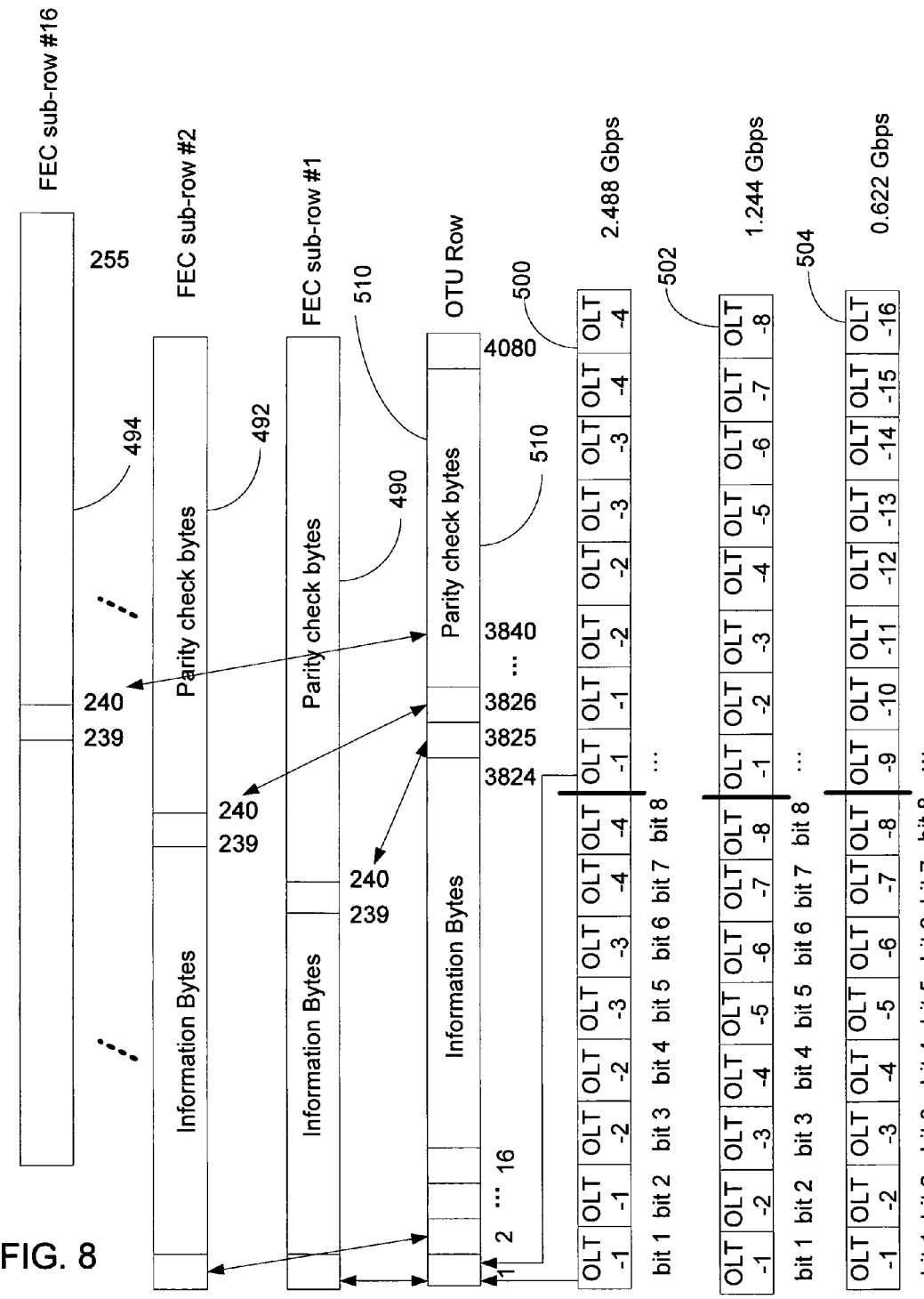
FIG. 8 illustrates GPON OTU data mapping and FEC sub-rows in the preferred embodiment of the present invention.

FIG. 8 illustrates GPON-OTU data mapping and FEC subrows in the preferred embodiment of the present invention. The forward error correction shown in signal 500 preferably utilizes 16 byte interleaved RS (255,239) code working on a byte-level. For FEC processing, an OTU row 510 is separated into 16 sub-rows using byte-interleaving (sub-rows 490, 492, and 494 are shown). Each FEC encoder/decoder processes one of the sub-rows depicted in FIG. 8. The mapping of a row 500 having a Quad-2.5 Gbps GPON to OTU-2 (or ODU-1 which yields to an equivalent pattern) is depicted in FIG. 8. The bytes of each OTU row are filled with two bits of data from each of the four OLTs. Lower rate PONS also utilize similar mappings which are depicted in FIG. 8 as rows 502 and 504. In addition, several rates may be mixed on the OTU accordingly. For supporting more than Quad-PON, other extensions such as WDM options may be utilized. SDH delay, jitter and frame alignment specification are strict enough for the GPON system to be operable.

The extender device 200 is preferably a 10-Gigabit small form factor pluggable module (XFP) which is a serial-to-serial, hot-pluggable, data-agnostic multi-rate optical transceiver intended to support Telecom applications (OC-192 and OTU-2) and Datacom applications (10 GbE and 10 Gbps fiber channel). The extender device may be utilized to implement single mode or multi-mode serial optical interfaces at 805 nm, 1310 nm and 1550 nm and support CWDM and DWDM. Table 2 below illustrates 10G Formfactor Interface, XFI, supported data rates for the extender device in the preferred embodiment of the present invention.

TABLE 2

| Standard | Description | Nominal bit rate | Units |
| --- | --- | --- | --- |
| OC-192-SDH-64 | SONET | 9.95 | Gigabaud |
| IEEE std-802.3ae | 10 Gb/s Ethernet LAN PHY | 10.31 | Gigabaud |
| INCITS/T11 Project 1413-D | 10GFC | 10.52 | Gigabaud |
| ITU G 709(OTU-2) | OC-192 Over FEC | 10.70 | Gigabaud |
| Emerging | 10 Gb/s Ethernet Over G.709 | 11.09 | Gigabaud |

Figure 9:
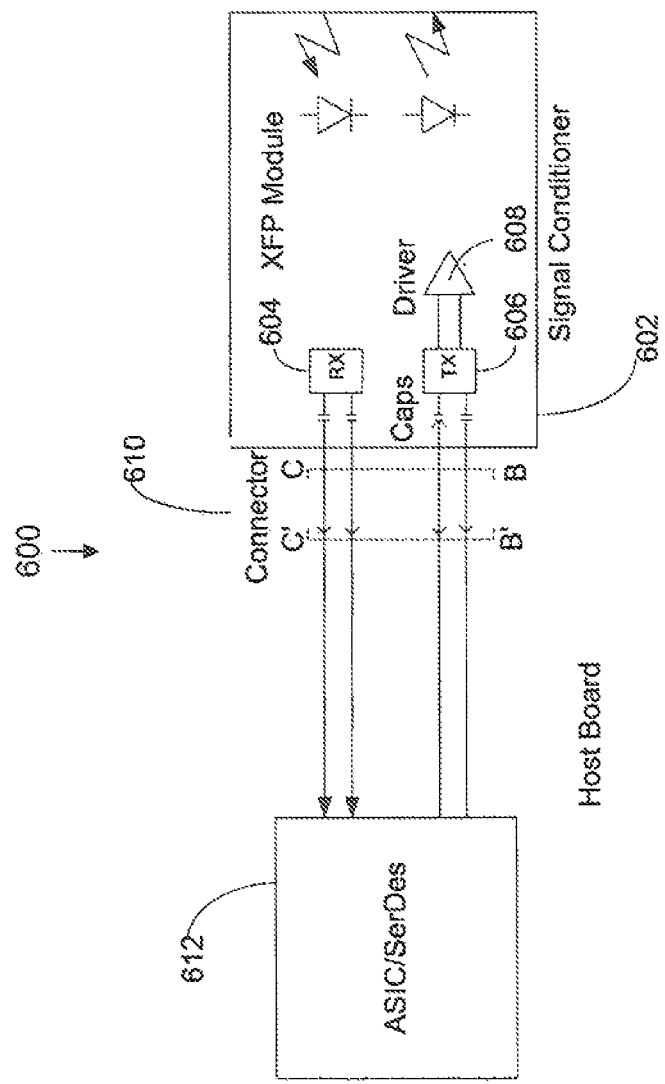
FIG. 9 illustrates a simplified block diagram of the components of a host board for an XFP application utilized in the extender device.

FIG. 9 illustrates a simplified block diagram of the components of a host unit 600 for an XFP application utilized in the extender device 200. The host unit includes an XFP module 602 having a receiver 604 and a transmitter 606. The transmitter includes a driver 608. The XFP module is connected by a connector 610 at C' with C and B' with B to a ASIC/SerDes 612. The XFP module includes a signal conditioner in the receiver and the transmitter that includes a 3R signal regenerator and CDR. In the preferred embodiment of the present invention, the OLT may be extended with the mirrored functionality of the extender device 200 (i.e., XFP and synchronous digital hierarchy (SDH) TDM is available).

FIG. 10 is a flow chart illustrating the steps of an embodiment of the method of the present invention. At step 700, upstream PON signals are TDM multiplexed on a trunk fiber connected to a central office OLT. (Downstream PON signals destined to ONTs are TDM de-multiplexed at this point.) At step 702, FEC is applied to the PON signals. At step 704, OEO regeneration is applied to the PON signals. At step 706, an optional step is shown in which the signals from the PON are aggregated with signals from a second PON over the trunk fiber.

The present invention provides several advantages over existing systems. The present invention provides a reach extension over regular PON systems by a factor of ten, thereby allowing for long backhaul. In addition, there is a reduction of operational costs in the access network by central office reduction and central office economies of costs, material energy, maintenance, and the like. Higher levels of aggregation are attainable because virtually any number of PONs may be fed via a single fiber (avoiding a skews limitation). Additionally, cost efficiencies are realized with the present invention because of the availability of off-the-shelf components. With the present invention, all WDM options are available. The backhaul signal utilized in the present invention is a standard continuous mode signal (burst penalty). Furthermore, the GPON ODN is not impacted by the extension. The present invention provides a flexibility and scalability in implementation with current systems due to TDM (mixing of PONs). If more PONs are back-hauled, the extender device may provide further extension by utilizing higher rates or more XFPs.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of extending a trunk reach of a passive optical network (PON), the method comprising the steps of:
providing an optical network termination (ONT) for processing upstream and downstream PON signals on a trunk fiber, wherein the ONT comprises a first Gigabit PON Transmission Convergence (GTC) function and a first GPON physical media layer (GPM) function;
further providing an optical line termination (OLT) communicating with the ONT, wherein the OLT comprises a second GTC function;
coupling an extender device to the OLT, wherein the extender device comprises a second GPM function;
further coupling the extender device to the ONT over an optical distribution network (ODN) that utilizes a GPON protocol;
time division multiplexing upstream and downstream PON signals on the trunk fiber using the extender device, wherein the PON signals are packed into optical channel data units (ODUs) and mapped onto an optical channel transport unit (OTU);
applying forward error correction (FEC) to the PON signals using the extender device; and,
applying optical-electrical-optical (OEO) regeneration to the PON signals using the extender device,
whereby at least the upstream PON signals are extended by the extender device without changing the GPON functionality of the ODN.

2. The method recited in claim 1, wherein the step of applying OEO regeneration includes applying burst re-shaping, re-amplifying, re-timing (3R) regeneration to the PON signals.

3. The method recited in claim 1, wherein the step of applying OEO regeneration includes conditioning the PON signals by a re-shaping, re-amplifying, re-timing (3R) regenerator and clock and a data recovery unit.

4. The method recited in claim 1 wherein the step of applying OEO regeneration includes utilizing a small form factor pluggable module for applying OEO regeneration of the PON signals.

5. The method recited in claim 4, wherein the step of applying OEO regeneration includes performing transmit and receive conversion of the PON signals by the module.

6. The method recited in claim 1, further comprising the step of aggregating signals from a second PON over the trunk fiber using the extender device.

7. The method recited in claim 6, wherein the step of aggregating signals from a second PON over the trunk fiber includes applying wavelength division multiplexing (WDM) to the signals from the PON and the second PON.

8. The method recited in claim 1 wherein the steps of time division multiplexing of upstream and downstream PON signals and applying OEO regeneration of the PON signals are conducted using the extender device residing within a central office.

9. A system for extending a trunk reach of a passive optical network (PON), comprising:
an optical network termination (ONT) for processing upstream and downstream PON signals on a trunk fiber, wherein the ONT comprises a first Gigabit PON Transmission Convergence (GTC) function and a first GPON physical media layer (GPM) function;
an optical line termination (OLT) residing within a central office communicating with the ONT, wherein the OLT comprises a second GTC function; and,
an extender device coupled to the OLT and the ONT, wherein the extender device comprises a second GPM function and wherein the extender device is coupled to the ONT over an optical distribution network (ODN) that utilizes a GPON protocol, the extender device including:
a time division multiplexing (TDM) unit for multiplexing the PON signals on the trunk fiber, wherein the PON signals are packed into optical channel data units (ODUs) and mapped onto an optical channel transport unit (OTU);
a forward error correction (FEC) unit for applying FEC to the PON signals; and,
a regenerator for applying optical-electrical-optical (OEO) regeneration to the PON signals,
whereby at least the upstream PON signals are extended by the extender device without changing the GPON functionality of the ODN.

10. The system recited in claim 9, wherein the regenerator applies burst re-shaping, re-amplifying, re-timing (3R) regeneration to the PON signals.

11. The system recited in claim 10, wherein the TDM unit includes a clock and data recovery unit.

12. The system recited in claim 9, wherein the regenerator includes a small form factor pluggable module for applying OEO regeneration.

13. The system recited in claim 12, wherein the module is adapted to perform transmit and receive conversion of the PON signals.

14. The system recited in claim 9, wherein the extender device is adapted to aggregate signals from a second PON over the trunk fiber.

15. The system recited in claim 4, wherein the extender device is adapted to aggregate the signals by applying wavelength division multiplexing (WDM) to the signals from the PON and the second PON.

16. The system recited in claim 9, wherein the OLT includes an OLT extension for duplicating the functionality of the extender device by providing a second TDM unit for applying TDM to the PON signals and a second regenerator for applying OEO regeneration to the PON signals.

17. An extender device for extending a trunk reach of a passive optical network (PON), wherein the extender device is coupled to an optical line termination (OLT) residing within a central office and to an optical network termination (ONT) that processes upstream and downstream PON signals on a trunk fiber, wherein the ONT comprises a first Gigabit PON Transmission Convergence (GTC) function and a first GPON physical media layer (GPM) function, wherein the OLT comprises a second GTC function, wherein the extender device comprises a second GPM function and is coupled to the ONT over an optical distribution network (ODN) that utilizes a GPON protocol, wherein the extender device comprising:

a time division multiplexing (TDM) unit for multiplexing the PON signals on the trunk fiber, wherein the PON signals are packed into optical channel data units (ODUs) and mapped onto an optical channel transport unit (OTU);

a forward error correction (FEC) unit for applying an FEC to the PON signals; and, a regenerator for applying optical-electrical-optical (OEO) regeneration to the PON signals, whereby PON signals are extended by the extender device without changing the GPON functionality of the ODN.

18. The extender device recited in claim 17, wherein the regenerator is adapted to apply burst re-shaping, re-amplifying, re-timing (3R) regeneration of the PON signals.

19. The extender device recited in claim 18, wherein the TDM unit includes a clock and data recovery unit.

20. The extender device recited in claim 17, wherein the regenerator includes a small form factor pluggable module for applying OEO regeneration.

21. The extender device recited in claim 20, wherein the small form factor pluggable module is adapted to perform transmit and receive conversion of the PON signals.

22. The extender device recited in claim 17, wherein the extender device is adapted to aggregate signals from a second PON over the trunk fiber.

23. The extender device recited in claim 17, wherein the extender device is adapted to aggregate the signals by applying wavelength division multiplexing (WDM) to the signals from the PON and the second PON.

24. The extender device recited in claim 17, wherein the extender device is located with the OLT residing within the central office.

* * * * *

UNITED STATES PATENT AND TRADEMARK OFFICE
CERTIFICATE OF CORRECTION

PATENT NO. : 8,472,804 B2
APPLICATION NO. : 12/531665
DATED : June 25, 2013
INVENTOR(S) : Trojer It is certified that error appears in the above-identified patent and that said Letters Patent is hereby corrected as shown below:

On the title page, in Item (75), under "Inventor", in Column 1, Line 1, delete "Taby" and insert -- Täby --, therefor.

On the title page, in Item (56), under "OTHER PUBLICATIONS", in Column 2, Line 1, delete "al:" and insert -- al., --, therefor.

In the Specification

In Column 2, Line 24, delete "PONS." and insert -- PONs. --, therefor.

In Column 5, Line 28, delete "Includes" and insert -- includes --, therefor.

In Column 5, Line 39, delete "PI-IY" and insert -- PHY --, therefor.

In Column 6, Line 17, delete "OUT-1[V] 316, an OUT-2[V] 318," and insert -- OTU-1[V] 316, an OTU-2[V] 318, --, therefor.

In Column 6, Line 18, delete "OUT-3[V] 320." and insert -- OTU-3[V] 320. --, therefor.

In Column 6, Line 37, delete "PONS" and insert -- PONs --, therefor.

In the Claims

In Column 8, Line 20, in Claim 4, delete "claim 1" and insert -- claim 1, --, therefor.

In Column 8, Line 35, in Claim 8, delete "claim 1" and insert -- claim 1, --, therefor.

Signed and Sealed this
Fifth Day of November, 2013

Teresa Stanek Rea
*Deputy Director of the United States Patent and Trademark Office*